United States Patent [19]

DeLorenzo et al.

[11] Patent Number: 4,765,943

[45] Date of Patent: Aug. 23, 1988

[54] THERMAL NEUTRON DETECTORS AND SYSTEM USING THE SAME

[75] Inventors: Joseph T. DeLorenzo, Loudon County; Francis E. Levert; James C. Robinson, both of Knox County; Robert W. Hendricks, Anderson County, all of Tenn.

[73] Assignee: Technology for Energy Corporation, Knoxville, Tenn.

[21] Appl. No.: 802,780

[22] Filed: Nov. 29, 1985

[51] Int. Cl.$^4$ .............................................. G21C 17/00
[52] U.S. Cl. .................................. 376/154; 376/247; 376/254; 376/255
[58] Field of Search ................. 376/154, 247, 254, 255

[56] References Cited

U.S. PATENT DOCUMENTS

| | | | |
|---|---|---|---|
| 3,001,072 | 9/1961 | Glick | 376/154 |
| 4,298,430 | 11/1981 | Rolstad et al. | 376/254 |
| 4,313,792 | 2/1982 | Smith | 376/247 |
| 4,406,011 | 9/1983 | Burns | 376/247 |
| 4,418,035 | 11/1983 | Smith | 376/247 |
| 4,581,813 | 4/1986 | Terhune | 376/154 |

Primary Examiner—Salvatore Cangialosi
Attorney, Agent, or Firm—Pitts and Brittian

[57] ABSTRACT

A solid state thermal neutron detector. The improved detector for particularly high temperature applications of thermal neutron flux determination, employs a differential thermocouple unit having the hot junction positioned within a cylindrical pellet or compact of uranium dioxide ($UO_2$) partially enriched in uranium-235. The cold junction is positioned within a cylindrical pellet or compact of depleted uranium dioxide, this second pellet having the identical mass as the first. The uranium-containing pellets are spaced apart by a cylindrical pellet of a high temperature insulator, such as MgO or aluminum oxide ($Al_2O_3$). Similar insulator pellets are positioned outwardly from the uranium-containing pellets to prevent heat loss. The entire assembly is enclosed in a cylindrical sheath of a material resistant to the environment of the detector, with this sheath being radially swaged upon the pellets to achieve intimate thermal contact between the pellets and the differential thermocouple. In one embodiment, a plurality of differential thermocouples are inserted in alternating pellets. In a preferred embodiment, a heater unit is included with a high temperature portion proximate the hot junction and a lower temperature portion proximate the cold junction. The thermocouple is connected to appropriate measuring circuits and monitor, and the heater is connected to a regulated and adjustable heater supply. Provision for axial movement of the detector unit and for determining absolute temperatures are discussed.

17 Claims, 3 Drawing Sheets

THERMAL NEUTRON DETECTORS AND SYSTEM USING THE SAME

TECHNICAL FIELD

The present invention relates generally to the detection of thermal neutrons, and more particularly to a solid state detector for thermal neutrons in the presence of gamma rays and fast neutrons, as well as to a detector system for use with nuclear reactors and other nuclear systems to accomplish flux mapping of thermal neutrons therein.

BACKGROUND OF THE INVENTION

In the nuclear reactor field there has always been a need for instruments for the mapping of thermal neturon fluxes in both power and research reactors. Heretofore, various forms of self-powered neutron detectors (SPNDs) and ion chambers haved served this need in light water reactors. Although generally acceptable for use in such environments, these devices suffer several limitations when used for reactors operating at higher temperatures. For example, they cannot be used at temperatures above about 400 C., while the operating temperature of a high temperature gas-cooled reactor (HTGR) is in the vincity of 1000 C. In the case of fission chambers, the gas seals often leak, thus making them inoperable. In the case of SPNDs, the sensitivity is typically very low and the time response is very slow - in excess of thirty seconds.

One type of solid state thermal neutron detector in the prior art is known as a "thermopile" and is typically described in Instrument Society of America, Paper No. 53-14-3, published in 1953, "Preliminary Work on a $U^{235}$ Thermopile", authored by J. T. DeLorenzo (one of the present inventors) and F. R. Herold. In such a device, a differential thermocouple is constructed in which the hot junction of the thermocouple is coated with a small quantity of fissile material (such as uranium-235) and the cold junction is coated with a non-fissile non-uranium equivalent material. A group of such coated thermocouples were installed in a "can" several inches in length and about 1.5 inches in diameter. Heretofore, however, these devices have not been used extensively in nuclear reactor flux monitoring because it has not been possible to construct them with adequate reproducibility.

Accordingly, it is a primary object of the present invention to provide a thermal neutron detector that can withstand the hostile environments of high temperature nuclear reactors and can be calibrated in situ.

It is another object of the present invention to provide an inexpensive thermal neutron detector of small size for use in the mapping of thermal fluxes of high temperature reactors.

It is also an object of the present invention to provide a thermal neutron detector having sufficient accuracy in the presence of gamma rays and fast neutrons whereby the thermal neutron flux of a high temperature nuclear reactor can be mapped.

Furthermore, it is an object of the present invention to provide a solid state thermal neutron dosimeter that is fabricated using known technologies whereby reliability and uniformity are achieved.

Other objects and advantages of the present invention will become apparent upon a consideration of the following drawings and a complete description of the invention.

SUMMARY OF THE INVENTION

According to the present invention, there is provided a differential thermocouple wherein the hot junction thereof is installed in a pellet of enriched uranium dioxide and the cold junction is installed in a pellet of depleted uranium dioxide. These pellets are separated by a pellet of a suitable thermal insulator, such as aluminum oxide, with all of the pellets encased in a suitable sheath, such as Inconel. The pellets are either performed, or are formed in situ by a "sphere-pack" process. The pellets after insertion in the sheath are subjected to compaction as by radially swagging the sheath to achieve thermal contact with the thermocouple. The two uranium dioxide pellets have substantially the same sensitivity for both gamma radiation and fast neutrons, thus making the device nominally insensitive to those radiations. However, fissions in the enriched pellet caused by the thermal neutrons provide a heating, with this heating being detected by the differential thermocouple as a function of the thermal neutron flux. A plurality of the detectors throughout the reactor provide information as to the mapping of the thermal neutron flux of the reactor, or a single detector can be moved within the reactor for flux mapping. Provision is made for in situ calibration of the differential thermocouple and thus the detector.

BEST MODE OF THE INVENTION

Figure 1:
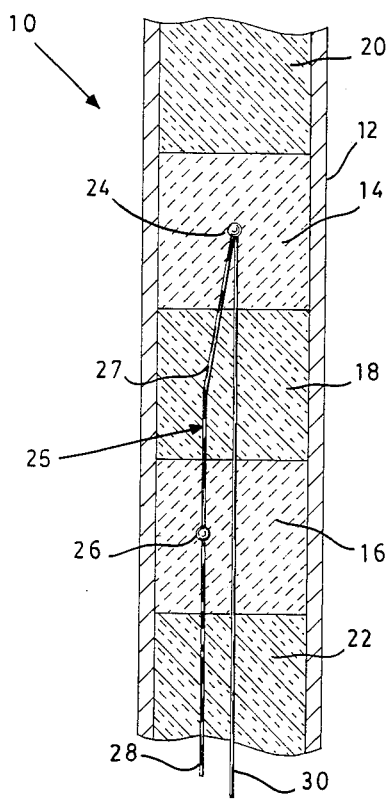
FIG. 1 is an enlarged cross-sectional drawing of the essential components of a detector of the present invention.

Referring now to FIG. 1, shown therein is a single detector unit at 10 that is the heart of the present invention. Positioned within a sheath tube 12 of, for example, Inconel are a pair of uranium dioxide pellets or compacts 14, 16, each having equal mass. One of these, e.g., pellet 14, is fabricated from partially enriched uranium (U-235) while the other pellet 16 is fabricated from depleted uranium (U-238). The uranium-containing pellets 14, 16 are separated by a pellet or compact 18 of a suitable thermal insulating material, such as aluminum oxide (Al$_2$O$_3$) or magnesium oxide (MgO). Preferably, the aforementioned pellets 14, 16 and 18 are sandwiched between a pair of additional pellets 20, 22 of the same type of thermal insulating material.

Positioned within the pellet of partially enriched uranium dioxide 14 is a hot junction 24 of a differential thermocouple 25, and the cold junction 26 is positioned within the pellet of deplected uranium dioxide 16. Typically the thermocouple is fabricated from conventional thermocouple materials such as chromel/alumel, or tungsten/rhenium. The choice is made based on the desired sensitivity and the operating environment requirements. The thermocouple junctions 24, 26 are joined in a conventional manner with lead 27, and leads 28, 30 therefrom extend from the sheath 12 to be attached to suitable measuring circuits. If only one differential thermocouple is to be used, end closures (not shown) are added to the sheath 12 to enclose the outer pellets 20, 22.

Figure 7:
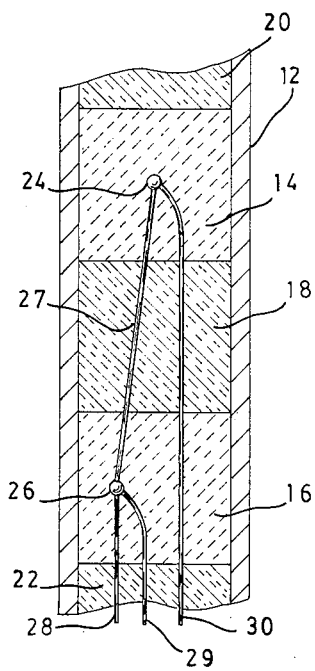
FIG. 7 is an enlarged cross-sectional drawing illustrating use of a differential thermocouple for absolute temperature measurement as part of the present invention.

In this FIG. 1 (and FIGS. 3, 5, and 7), the differential thermocouple 25 has been illustrated in schematic form, i.e., with the junctions and leads to those junctions. This is for ease of illustration of the principle; however, in practice the differential thermocouple would be a conventional sheathed thermocouple such as is available commercially. Thus, the pellets, if performed, need only a circular passageway to accept the sheathed thermocouple.

The specific pellets can be fabricated in one of at least two methods. For example, the pellets can be prefabricated (e.g., by hot pressing and sintering) with passageways to receive the thermocouple. These pellets are then threaded on the thermocouple prior to insertion into the sheath. Another satisfactory fabrication method is known as "sphere pack". According to this method, the thermocouple unit is positioned within the sheath and small spheres of the appropriate materials are compacted about the thermocouple using vibrational energy imparted to the sheath.

In order for proper functioning of the detector, the thermocouple must be completely insulated from the sheath. In addition, the thermocouple must respond reliably and reproducibly. In order to achieve this type of response, it is necessary to swage the sheath after the insertion of the performed pellets (or after the sphere pack compaction) until the process yields an instrument of predictable and repeatable properties. By swaging, the size of the detector is reduced and, more importantly, the thermal conductivity throughout the pellets and between the thermocouple and the sheath is made uniform so that operation is predictable, uniform and reproducible.

The specific materials of construction and the size of the detector units will depend, to some extent, upon the particular environment in which they are to be utilized. Although Inconel is indicated above as the material for the sheath 12, other suitable materials can be substituted such as stainless steel, Hastalloy, etc., where the properties of these metals are preferred. With regard to the insulating materials, MgO is considered a better thermal insulator at higher temperatures than aluminum oxide. Also, while the use of uranium dioxide is indicated, some applications can use a ceremet containing the uranium.

Typically the detector of the present invention will have a finished outer diameter of about 3/16 inch and a uranium-235 enrichment of about 2-3%. The sensitivity of the detector is determined by the quantity and enrichment of the isotopic fissionable material, while the time response is inversely related to the size. Thus, a larger mass makes the detector slower to respond and more sensitive, while a smaller unit responds more rapidly but is less sensitive. Accordingly, the exact size for a given application will be chosen on the basis of the desired response. For the above-cited 3/16 inch detector with 3% enrichment, a flux of $10^{14}$ nvt will yield a temperature difference between the two uranium-containing pellets of about 350 C. This will provide a sufficient difference in temperature over a wide range of thermal neutron fluxes such that adequate mapping of the flux can be achieved.

For the flux mapping of a specific nuclear reactor, for example, more than one neutron detector of the present invention can be used. This is illustrated schematically in FIG. 2. This is not intended to represent a specific type of nuclear reactor but is only a generalized construction. A shell 32 is shown as enclosing a nuclear reactor core 34. Positioned within the core 34 are a plurality of instrument channels, such as at 36, 38 which may or may not be provided with a "thimble" or lining. Shown as positioned within the instrument channels are a plurality of thermal neutron detectors of the present invention. For example, detectors 10, 10A are identified in channel 36. An enlargement of this portion of the channel 36 is shown in FIG. 3. Leads from any detector in channel 36 pass through cable 40 to appropriate and conventional measuring circuits 44, and similar leads from units in channel 38 pass through cable 42 also to the measuring circuits. If there are detector units in any other instrument channels, they also are connected in a similar manner. The measuring circuits 44 typically are connected to a conventional recorder system as indicated at 46 through a cable 48. It will be recognized by persons versed in the art that in some applications the detector units will not be fully, self compensating for gamma radiation and fast neutrons. In such cases, compensation signals can be introduced into the measuring circuits, as at 47, based upon calibration tests, so that the output to the recorder is primarily only due to the thermal neutron flux.

Figure 2:
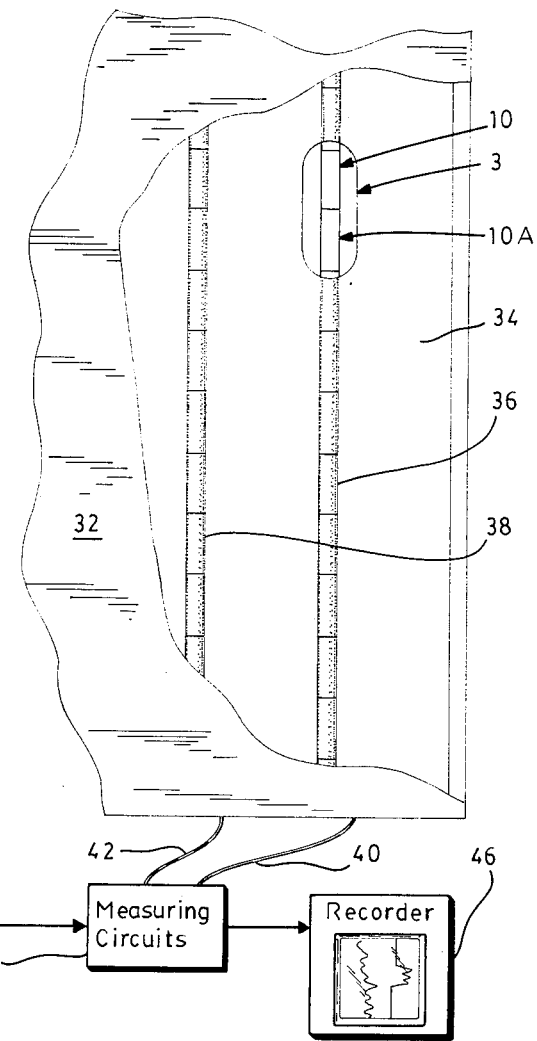
FIG. 2 is a cutaway drawing schematically illustrating a plurality of detectors in a monitoring tube, and a plurality of monitoring tubes, for the mapping of the flux of a nuclear reactor.
Figure 3:
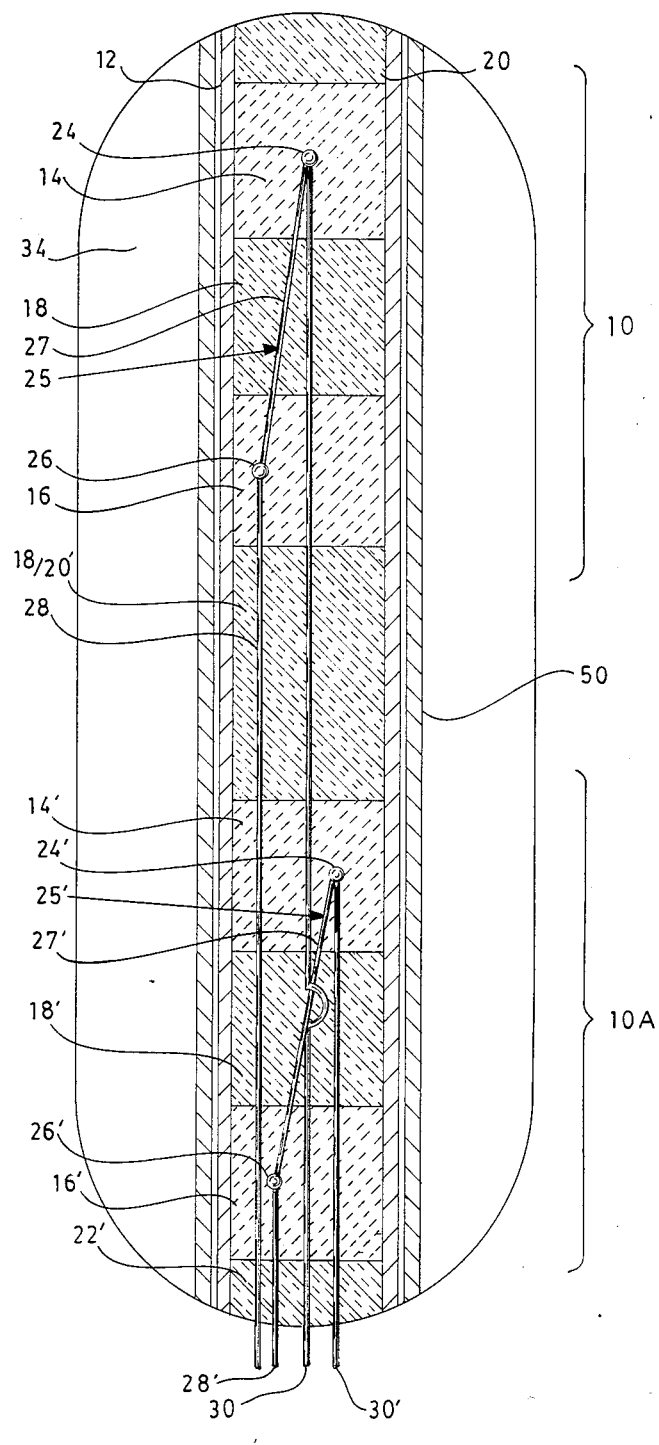
FIG. 3 is an enlarged cross-sectional drawing taken at 3 in FIG. 2 showing two detector units axially positioned in a monitoring tube.

The region indicated at 3 in FIG. 2 is shown as enlarged in FIG. 3. This figure illustrates how a second detector unit 10A can be axially aligned with a first detector unit 10. Since the units normally are identical for a particular application, all like components are identified with the same number but with a prime. Thus, the second unit has a hot junction 24' in a pellet of partially enriched uranium dioxide 14', and a cold junction 26' in a pellet of depleted uranium dioxide 16'. These pellets are separated by a pellet of thermal insulator (aluminium or magnesium oxide) 18'. The junctions are joined with lead 27', and the output leads are designated at 28' and 30'. Leads 30 and 30', when connected to the measuring circuits, then provide the signals to indicate the temperature of the hot junctions. When conventional sheathed thermocouples are used, a common connection is made external to the detector.

As indicated with reference to FIG. 2, the neutron detectors of the present invention can be inserted in an instrument channel thimble where such is desired. FIG. 3 illustrates such a thimble at 50. This thimble serves as a guide during insertion of the neutron detectors into, or withdrawl from, a nuclear reactor. In addition, the thimble serves to further separate the neutron detectors from adverse environments of the reactor core, and to prevent leakage from the core.

Figure 4:
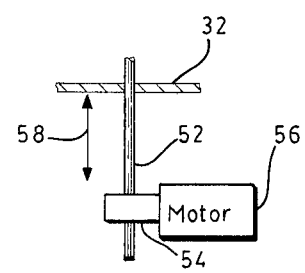
FIG. 4 is a schematic diagram of a typical system for moving a detector unit of the present invention within a nuclear reactor.

In many applications of the present invention, one or more detector units will be periodically moved through a reactor core or other device for which the thermal flux is to be determined or mapped. Shown schematically in FIG. 4 is a mechanism for moving a detector unit. A drive rod 52 is typically attached to the end of the sheath 12, with the end thereof extending exterior to the reactor shield 32 (FIG. 2). This drive rod is coupled to a transmission 54 to provide an appropriate speed of movement, with the transmission 54 being driven by a motor 56. Thus, the detector unit can be moved in the directions indicated by the arrow 58. Although not shown, a position sensor would be typically attached to the rod 52 (or other appropriate portion of the drive unit) so that the position can be correlated with the output signal of the detector unit.

Figure 5:
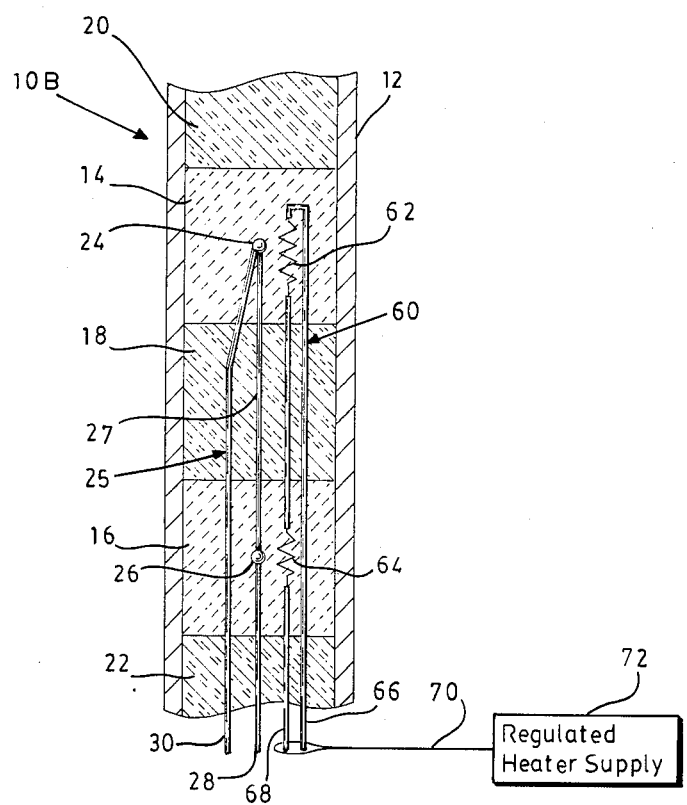
FIG. 5 is an enlarged cross-sectional drawing of another embodiment of the present invention in which a controlled heater unit is incorporated for in situ calibration of the detector.

In most applications of the present invention it will be desirable, and perhaps necesary, to periodically check the calibration of the detector units and to recalibrate the same if necessary. It will be apparent to those versed in the art that this checking needs to be accomplished in situ. An embodiment 10B of the present invention for such applications is illustrated in FIG. 5. It can be seen that the majority of components of this embodiment are identical with those illustrated in FIG. 1, and thus those components bear the same identification numerals. As before, a differential thermocouple 25 has a hot junction 24 positioned within a pellet 14 of partially enriched uranium dioxide (or other suitable uranium-containing substance) and a cold junction 26 positioned in a pellet 16 of depleted uranium dioxide (or other suitable uranium-containing substance). As stated with regard to FIG. 1, this differential thermocouple 25 is a conventional sheathed unit. The pellets 14 and 16 are separated by a thermal insulator pellet 18 of aluminum oxide ($Al_2O_3$) or magnesium oxide (MgO), etc. Other axially-positioned insulator pellets 20 and 22 prevent the loss of heat from the uranium-containing pellets.

Furthermore, this embodiment 10B contains a heater unit 60. More specifically, the heater unit 60 is constructed so as to have a high temperature portion 62 that is placed proximate the hot junction 24 of the thermocouple 25, and a relative lower temperature portion 64 that is placed proximate the cold junction 26. By this construction, the temperatures at these locations can be made to simulate the temperatures (and temperature differential) achieved when the detector is used to determine the thermal neutron flux. While the heater 60 is depicted schematically with just heater portions 62, 64 and wires 66, 68, in practice the heater 60 would be a conventional sheathed cylindrical heater having the selected resistance portions at appropriate locations to achieve the desired temperatures. This heater 60 would be connected by cable 70 to a regulated (and adjustable) heater supply 72 so as to permit the selection of the temperatures at the hot and cold junction(s).

Figure 6:
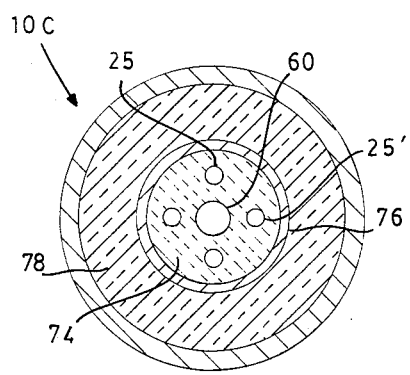
FIG. 6 is an enlarged transverse cross-sectional drawing of a further embodiment of the present invention in which the differential thermometer and the controlled heater unit of FIG. 5 are pre-assembled.

If multiple thermocouple units are installed in the sheath 12, as illustrated in FIG. 3, the heater 60 would contain alternating high and low resistance portions positioned so as to be proximate the respective alternating hot and cold junctions of the thermocouples. This alternate embodiment 10B is fabricated using the method explained with regard to FIG. 1. Furthermore, if multiple sheathed thermocouple units 25, 25', etc. are used in flux mapping device, the heater can be placed centrally in the device and the thermocouples spaced symmetrically about the heater (see FIG. 6).

For the commercial production of a thermal neutron flux detector embodying the principles set forth herein, a simplification can be achieved by "prepackaging" the differential thermocouple units and the heater unit. This construction is illustrated in the transverse cross-section shown in FIG. 6. The sheathed cylindrical heater 60 and the sheathed differential thermocouples 25, 25', etc., which are symmetrically positioned about the heater, are embedded in an appropriate insulation 74. This insulation, which can be $Al_2O_3$, is typically in the form of pre-forms threaded upon the heater and thermocouples and inserted within an inner sheath 76. Alternately, the insulation can be formed in place by sphere pack techniques within the inner sheath 76. This inner sheath is then swaged to effect compaction of the insulation 74 and assure uniform thermal transfer between the sheath 76, the thermocouples 25, 25', etc. and the heater 60. Then using this prefabricated central piece, the appropriate pellets of uranium-containing substance and thermal insulation are formed in annular configuration as indicated at 78 and threaded upon the inner sheath 76. The entire unit is completed by the addition of the exterior sheath 12, with its subsequent radial swaging to achieve proper compaction of the region 78. Although not shown, the outer sheath of commercially fabricated detectors would be provided with a vent for the venting of fission gases produced within the detector as a result of the reaction between the thermal neutrons and the uranium-235.

In addition to the determination of neutron flux at a specific location, or a plurality of locations, it is often desirable to determine the absolute temperature. A schematic drawing of a modified detector is illustrated in FIG. 1. The basic differential thermocouple is the same as illustrated in FIG. 1 (with the components carrying the same number). By adding an additional lead 29 to the cold junction 26, a temperature reading at the cold junction is obtained by using a signal present on leads 28 (alumel) and 29 (chromel).

As stated hereinabove, the materials and method of construction that have been identified provide a solid state thermal neutron detector that can be used in a high temperature environment, such as that of a high temperature gas cooled nuclear reactor. Since the detector can be tailored to a particular neutron spectrum, it will also have applications for flux monitoring in boiling water reactors, pressurized water reactors, research reactors, neutron spallations sources and other high intensity pulsed neutron sources.

From the foregoing, it will be apparent to a person skilled in the art that a solid state thermal neutron detector has been developed that will provide the sensitivity and reliability for the mapping of thermal neutron fluxes in high temperature environments as well as other environments. Although only a limited number of specific embodiments have been described in detail, such description is not to be taken as a limitation of the present invention. Rather, the scope of the invention is to be defined by the appended claims and their equivalents.

We claim:

1. A solid state thermal neutron detector for determining thermal neutron flux in the presence of a gamma ray flux in an environment of elevated temperature, which comprises:

a cylindrical sheath fabricated of a material resistant to such environment;

a first cylindrical uranium-containing pellet of a substance resistant to such elevated temperatuer closely received within said sheath, said substance of said first uranium-containing pellet being partially enriched in uranium-235 for producing fission reactions with each thermal neutrons and thereby creating a temperature in excess of such environment;

a second cylindrical uranium-containing pellet of substantially identical composition and mass as said first uranium-containing pellet closely received within said sheath, said second uranium-containing pellet being depleted in uranium-235, said second uranium-containing pellet absorbing substantially equal energy from such gamma ray flux as said first uranium-containing pellet;

cylindrical pellets of a thermal insulator material closely received within said sheath on opposite sides of, and between, said first and second pellets of uranium-containing substance, said insulator materials being an effective thermal insulator in such elevated temperature environment between said first and second uranium-containing pellets;

a differential thermocouple unit positioned within and insulated form said sheath, said thermocouple unit having a hot junction positioned in said first uranium-containing pellet and a cold junction positioned in said second uranium-containing pellet;

means connected to said thermocouple unit to measure a temperature differential between said hot and cold junctions as a function of such thermal neutron flux in such environment independent from such gamma ray flux; and wherein said sheath is radially swaged against all of said pellets sufficient to provide uniform heat transfer throughout said first and second uranium-containing pellets and to said thermocouple unit, and said sheath is provided with closures at opposite ends to physically isolate all of said pellets from such environment.

2. The detector of claim 1 wherein said uranium-containing substance is uranium dioxide ($UO_2$), said partial enrichment of uranium-235 is about three percent, said insulator material is aluminum dioxide ($Al_2O_3$), and said sheath is fabricated from Inconel.

3. The detector of claim 1 wherein said uranium-containing substance is uranium dioxide ($UO_2$), said partial enrichment of uranium-235 is about three percent, said insulator material is magnesium oxide (MgO), and said sheath is fabricated from Inconel.

4. The detector of claim 1 further comprising means attached to such detector for moving such detector through such environment for mapping of such neutron flux throughout such environment.

5. The detector of claim 1 further comprising additional cylindrical pellets of said uranium-containing substances, each of said additional uranium-containing pellets being alternately partially enriched in uranium-235 and depleted in uranium-235, and a plurality of differential thermocouple units positioned within said sheath, each of said plurality of differential thermocouple units having a hot junction positioned within a separate pellet of said uranium-containing substance wherein said uranium-containing substance is partially enriched in uranium-235, and a cold junction positioned within a separate pellet of said uranium-containing substance wherein said uranium-containing substance is depleted in uranium-235, each of said additional pellets of uranium-containing substance being separated by a sylindrical pellet of a material exhibiting thermal insulation properties in such elevated temperature environment.

6. The detector of claim 5 wherein said uranium-containing substance is uranium dioxide ($UO_2$), said partial enrichment of uranium-235 is about three percent, said insulator material is aluminum oxide ($Al_2O_3$), and said sheath is fabricated from Inconel.

7. The detector of claim 1 further comprising:

a heater unit positioned within said sheath and in thermal contact with said first and second pellets of said uranium-containing substance, said heater unit having a high temperature portion proximate said hot junction of said differential thermocouple unit and a lower temperature portion proximate said cold junction of said differential thermocouple unit; and an adjustable and regulated heater supply attached to said heater unit whereby a selected temperature can be established at said hot and cold junctions by said high temperature and low temperature portions, respectively, of said heater unit for calibration of said differential thermocouple unit.

8. A solid state thermal neutron detector for mapping thermal neutron flux in the presence of a gamma ray flux in a environment of elevated temperature, which comprises:

a cylindrical sheath fabricated of a material resistant to such environment;

a first cylindrdical uranium-containing pellet of a substance resistant to such elevated temperature closely received within said sheath, said substance of said first uranium-containing pellet being partially enriched in uranium-235 for producing fission reactions with such thermal neutrons and thereby create in said first uranium-containing pellet a temperature in excess of such environment temperature;

a second cylindrical uranium-containing pellet of substantially identical composition and bass as said first uranium-containing pellet closely received within said sheath, said second uranium-containing pellet being depleted in uranium-235 and absorbing substantially equal energy from such gamma ray flux as said first uranium-containing pellet;

cylindrical pellets of a thermal insulator material closely received within said sheath on opposite sides of, and between, said first and second pellets of uraniium-containing substance, said insulator materials being an effective thermal insulator in such elevated temperature environment between said first and second uranium-containing pellets;

a differential thermocouple unit positioned within and insulated from said sheath, said thermocouple unit having a hot junction positioned in said first uranium-containing pellet and a cold junction positioned in said second uranium-containing pellet;

means connected to said thermocouple unit to measure a temperature differential between said hot and cold junctions as a function of such thermal neutron flux in such environment independent from such gamma ray flux;

a heater unit positioned within said sheath and in thermal contact with said first and second pellets of said uranium-containing substance, said heater unit having a high temperature portion proximate said hot junction of said differential thermocouple unit and a lower temperature portion proximate said cold junction of said differential thermocouple unit;

an adjustable and regulated heater supply attached to said heater unit whereby a selected temperature can be established at said hot and cold junctions by said high temperature and low temperature portions, respectively, of said heater unit for calibration of said diffrnetial thermocouple unit;

means attached to such detector for moving such detector through such environment for such mapping of such thermal neutron flux throughout such environment; and wherein said sheath is radially swaged against all of said pellets sufficient to provide uniform heat transfer throughout said first and second uranium-containing pellets and to said thermocouple unit and said heater unit, and said sheath is xrovided with closures at opposite ends to physically isolate all of said pellets from such environment.

9. The detector of claim 8 wherein said uranium-containing substance is uranium dioxide ($UO_2$), said partial enrichment of uranium-235 is about three percent, said insulator material is aluminum dioxide ($Al_2O_3$), and said sheath is fabricated from Inconel.

10. The detector of claim 5 further comprising:

an elongated cylindrical heater unit positioned within said sheath and in thermal contact with said pellets of uranium-containing substance, said heater unit having a plurality of high temperature portions and a plurality of lower temperature portions, each high temperature portion being proximate one of said hot junctions of said differential thermocouple units, each lower temperature portion being proximate one of said cold junctions of said differential thermocuple units; and an adjustable and regulated heater supply attached to said heater unit whereby a selected temperature can be established at each said hot and cold junctions throughout such detector for the calibration of said differential thermocouple units.

11. The detector of claim 10 wherein said hot and cold junctions of said differential thermocouple, and said high and lower temperature portions of said heater unit, alternate along the length of said sheath.

12. The detector of claim 1 wherein an additional signal lead is connected to said cold junction of said differential thermocouple whereby measurement of a signal on said additional lead is proportional to an absolute temperature at said cold junction.

13. A solid state thermal neutron detector for the mapping of thermal neutron fluxes in the presence of a gamma ray flux in an environment of elevated temperature, which comprises:

an elongated cylindrical sheath fabricated of a material resistant to such environment, said sheath being provided with closures at opposite ends to physically isolate contents of said sheath from such environment;

a plurality of cylindrical uranium-containing pellets of a substance resistant to such elevated temperature closely received within said sheath, alternate of said uranium-containing pellets being partially enriched in uranium-235 and the other of said uranium-containing pellets being depleted in uranium-235, with all of said uranium-containing pellets being of substantially uniform mass to substantially equally absorb energy of such gamma ray flux;

a cylindrical pellet of insulator material closely received in said sheath and interposed between each of said alternating uranium-containing pellets, said insulator material being an effective thermal insulator between said uranium-containing pellets in such elevated temperature environment;

an elongated cylindrical sheathed heater unit disposed substantially on the axis of said sheath and threaded through said uranium-containing pellets and said insulator pellets, said heater unit being provided with a high temperature heater portion disposed within each of said uranium-containing pellets partially enriched in uranium-235, and with a lower temperature heater portion disposed within each of said uranium-containing pellets depleted in uranium-235;

a plurality of elongated cylindrically sheathed differential thermocouples symmetrically disposed about said heater unit and threaded through at least a portion of said uranium-containing pellets and said insulator pellets, each of said thermocouples having a hot junction and a cold junction, each of said thermocoupoles disposed axially along said sheath whereby each of said uranium-containing pellets partially enriched in uranium-235 contains said hot junction of a thermocouple and an adjoining uranium-containing pellet depleted in uranium-235 contains said cold junction of that thermocouple;

an adjustable and regulated heater supply attached to said heater unit whereby a selected temperature can be established at each said hot and cold junctions for calibration of said differential thermocouples;

measuring means attached to said differential thermocouples to determine output voltages from said differential thermocouples, said output voltages being function of differential temperature between said hot junction and said cold junction of a particular differential thermocouple and thus a function of such thermal neutron flux at said hot junction; and wherein said sheath is radially swaged against all of said pellets sufficient to provide uniform heat transfer throughout said uranium-containing pellets to said thermocouples, and between said heater unit and said thermocouples.

14. The detector of claim 13 wherein said uranium-containing substance is uranium dioxide ($UO_2$), said partial enrichment of uranium-235 is three percent, said insulator material is aluminum oxide ($Al_2O_3$), said sheath is fabricated from Inconel.

15. A solid state thermal neutron detector for mapping thermal neutron fluxes in the presence of a gamma ray flux in an environment of elevated temperature, which comprises:

an elongated cylindrical sheath having opposite end closures and fabricated form Inconel;

a plurality of cylindrical uranium dioxide ($UO_2$) pellets of substantially identical mass closely received within said sheath, alternate of said uranium dioxide pellets being enriched to about three percent in uranium-235, and the other of said uranium dioxide pelelts being depleted in uranium-235, said uranium dioxide pellets each substantially equally absorbing energy of such gamma ray flux;

a plurality of cylindrical pellets of aluminum oxide ($Al_2O_3$) closely received in said sheath, one of said aluminum oxide pellets interposed between each of said uranium dioxide pellets and between said uranium dioxide pellets and asid end closures;

an elongated cylindrical sheathed heater unit disposed substantially on the axis of said sheath and threaded through said uranium dioxide pellets and said aluminum oxide pellets, said heater unit being provided with a high temperature heater portion disposed within each of said uranium dioxide pellets of partial enrichment, and with a lower temperature heater portion disposed within each of said uranium dioxide pellets depleted in uranium-235;

a plurality of elongated cylindrical sheathed differential thermocouples symmetrically disposed about said heater unit and threaded through at last a portion of said uranium dioxide pellets and said aluminum oxide pellets, each of said thermocouples having a hot junction and a cold junction, each of said thermocouples disposed axially along said sheath whereby each of said uranium dioxide pellets partially enriched in uranium-235 contains said hot junction of one of said thermocouples and an adjoining uranium dioxide pellet depleted in uranium-235 contains said cold junction of that thermocouple;

an adjustable and regulated heater supply attached to said heat unit whereby a selected temperature can be established by said high and low temperature portions of said heater at said hot and cold junctions of said thermocouples, respectivley, for calibration of said differential thermocouples;

measuring means attached to said differential thermocouples to determine output voltages from said differential temperatura between said hot junction and aid cold junction of a particular differential thermocouple and thus a function of such thermal neutron flux at said hot junction of that thermocouple; and wherein said sheath is radially swaged against all of said pellets an amount sufficient ot provide uniform heat transfer through said uranium dioxide pellets to said thermocouples, and between said heater unit and said thermocouples.

16. A solid state thermal neutron detector for the mapping of thermal neutron fluxes in the presnece of a gamma ray flux in an environment of elevated temperature, which comprises:

an elongated cylindrical inner sheath fabricated of a material resistant to such environment, said inner sheath having closures at opposite ends;

an elongated cylindrical sheathed heater unit disposed substantially on the axis of said inner sheath, said heater unit being provided with alternating high temperature portions and lower temperature portions;

a plurality of elongated cylindrical sheathed differential thermocouples symmetrically disposed about said heater unit and within said inner sheath, each of said thermocouples having a hot junction and a cold junction, each of said thermocouples disposed axially along said inner sheath whereby said hot junction of each of said thermocouples is proximate a different of said high temperature portions of said heater unit and said cold junction of each of said thermocouples is proximate to an adjacent lower temperature portion of said heater unit;

a thermal insulating material disposed within said inner sheath interposed between said thermocouples and said heater unit, said insulating material compacted in situ by swaging said inner sheath a sufficient amount to provide uniform heat transfer within said inner sheath;

an elongated cylindrical outer sheath, having closures at opposite ends and fabricated from a material resistant to such environment, concentriclaly spaced about said inner sheath a selected distance to form an annular chamber between said outer wheath and said inner sheath;

a plurality of annular uranium-containing pellets of a substance resistant to such elevated temperature closely received in said annular chamber, alternate of said uranium-containing pellets being partially enriched in uranium-235 and disposed proximate said hot junctions of said thermocouples, the other of said alternating uranium-containing pellets being depleted in uranium-235 and disposed proximate said cold junctions of said thermocouples, with all of said uranium-containing pellets being of substantially unifrom mass to substantially equally abosorb energy of such gamma ray flux;

an annular pellet of thermal insulator material closely received in said annular chamber and interposed between each of said uranium-containing pellets and between said uranium-containing pelelts and said end closures of said outer sheath; and wherein said outer sheath is swaged upon said uranium-containing annular pellets and said insulator annular pellets sufficiently to provide uniform heat transfer throughout said pellets to said inner sheath.

17. The detector of claim 16 wherein said urnaium-containing substance is uranium dioxide ($UO_2$), said insulator material within said inner sheath is aluminum oxide ($Al_2O_3$), said inner and outer sheaths are fabricated from Inconel, said insulator pellets in said annular chamber are fabricated from aluminum oxide ($Al_2O_3$), and further comprises:

an adjustable and a regulated heater supply attached to said heater unit whereby a selected temperature can be established at each said hot and cold junctions of said differential thermocouples for calibration of asid thermocouples;

meansuring means attached to said differential thermocouples to determine output voltage from said differential thermocouples, said output voltages being a function of differential temperature between said hot junction and said cold junction of a particular differential thermocouple and thus a function of such thermal neutron flux at said hot junction; and a vent from said annular chamber for removal of fission gases generated within said annular chamber by reaction between such thermal neutrons and said uranium-235.

* * * * *